US011886948B2

(12) United States Patent
Forster

(10) Patent No.: US 11,886,948 B2
(45) Date of Patent: Jan. 30, 2024

(54) CONFIGURABLE ANTI-TAMPER SYSTEM AND METHOD

(71) Applicant: Avery Dennison Retail Information Services LLC, Mentor, OH (US)

(72) Inventor: Ian J. Forster, Chelmsford (GB)

(73) Assignee: Avery Dennison Retail Information Services LLC, Mentor, OH (US)

( * ) Notice: Subject to any disclaimer, the term of this patent is extended or adjusted under 35 U.S.C. 154(b) by 0 days.

(21) Appl. No.: 17/773,756

(22) PCT Filed: Nov. 4, 2020

(86) PCT No.: PCT/US2020/058886
§ 371 (c)(1),
(2) Date: May 2, 2022

(87) PCT Pub. No.: WO2021/092016
PCT Pub. Date: May 14, 2021

(65) Prior Publication Data
US 2022/0398424 A1 Dec. 15, 2022

Related U.S. Application Data

(60) Provisional application No. 62/930,078, filed on Nov. 4, 2019.

(51) Int. Cl.
*G06K 19/073* (2006.01)
*G06K 7/10* (2006.01)
(Continued)

(52) U.S. Cl.
CPC ... *G06K 19/07372* (2013.01); *G06K 7/10366* (2013.01); *G06K 19/0723* (2013.01); *G06K 19/07773* (2013.01)

(58) Field of Classification Search
CPC .................... G06K 19/07372; G06K 7/10366
(Continued)

(56) References Cited

U.S. PATENT DOCUMENTS

2014/0263659 A1* 9/2014 Kervinen ............. G06K 19/027
235/488
2017/0345269 A1* 11/2017 Schomacker ......... G09F 3/0335
(Continued)

FOREIGN PATENT DOCUMENTS

EP 1835448 9/2007

OTHER PUBLICATIONS

International Search Report and Written Opinion dated Feb. 11, 2021 issued in corresponding IA No. PCT/US2020/058886 filed Nov. 4, 2020.
(Continued)

*Primary Examiner* — Allyson N Trail

(57) ABSTRACT

A radio frequency identification (RFID) tag with a configurable anti-tamper structure includes an RFID chip electrically connected to a configurable anti-tamper structure. The configurable anti-tamper structure includes a plurality of conductive segments substantially oriented in a ladder configuration. At least some of the plurality of conductive segments are cut to leave a single conductive path in accordance to the desired tamper detection application, and the RFID tag is attached with the anti-tamper structure placed across a break point to be monitored for tampering. When tampering occurs, the conductive path is broken and the RFID chip changes the data sent in response to interrogation by an RFID reader.

12 Claims, 7 Drawing Sheets

(51) Int. Cl.
    *G06K 19/07*     (2006.01)
    *G06K 19/077*    (2006.01)

(58) Field of Classification Search
    USPC ........................................................ 235/451
    See application file for complete search history.

(56)            References Cited

U.S. PATENT DOCUMENTS

| | | | |
|---|---|---|---|
| 2018/0040220 A1* | 2/2018 | Landauer | G06F 21/86 |
| 2018/0240371 A1* | 8/2018 | Schwar | G06F 21/86 |
| 2019/0138864 A1 | 5/2019 | Reyland et al. | |
| 2020/0160004 A1* | 5/2020 | Yamamoto | G06K 7/10366 |
| 2020/0349821 A1* | 11/2020 | Entringer | G08B 13/2477 |
| 2021/0039937 A1* | 2/2021 | Tansey, Jr. | B67C 3/2628 |
| 2021/0097554 A1* | 4/2021 | Manicka | G06Q 30/0185 |
| 2021/0212379 A1* | 7/2021 | Naeckel | A24F 40/53 |
| 2021/0215562 A1* | 7/2021 | Boellaard | G01L 19/12 |
| 2021/0236736 A1* | 8/2021 | Murray | A61M 5/3134 |
| 2022/0355037 A1* | 11/2022 | Rivier | A61M 5/3134 |

OTHER PUBLICATIONS

International Preliminary Report on Patentability dated May 10, 2022 issued in corresponding IA No. PCT/US2020/058886 filed Nov. 4, 2020.

* cited by examiner

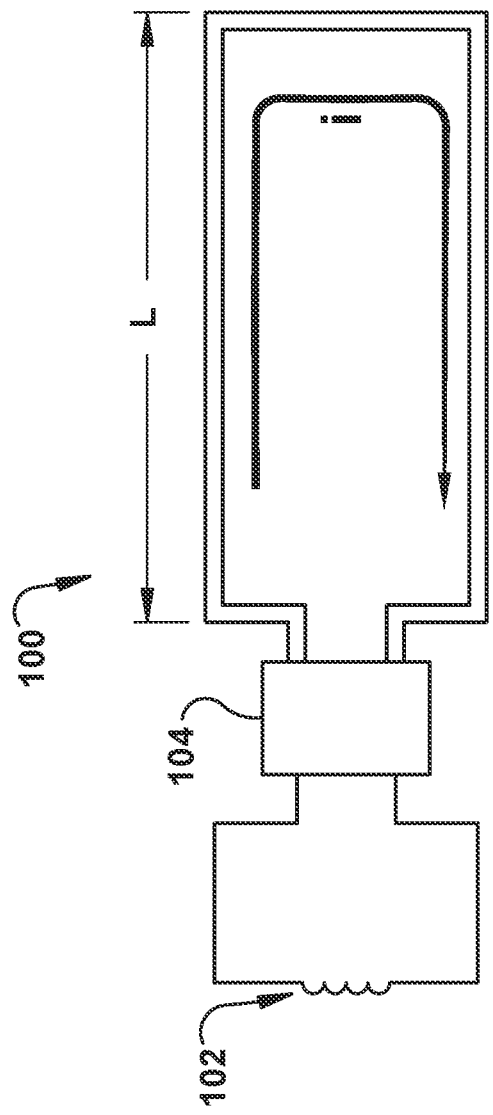
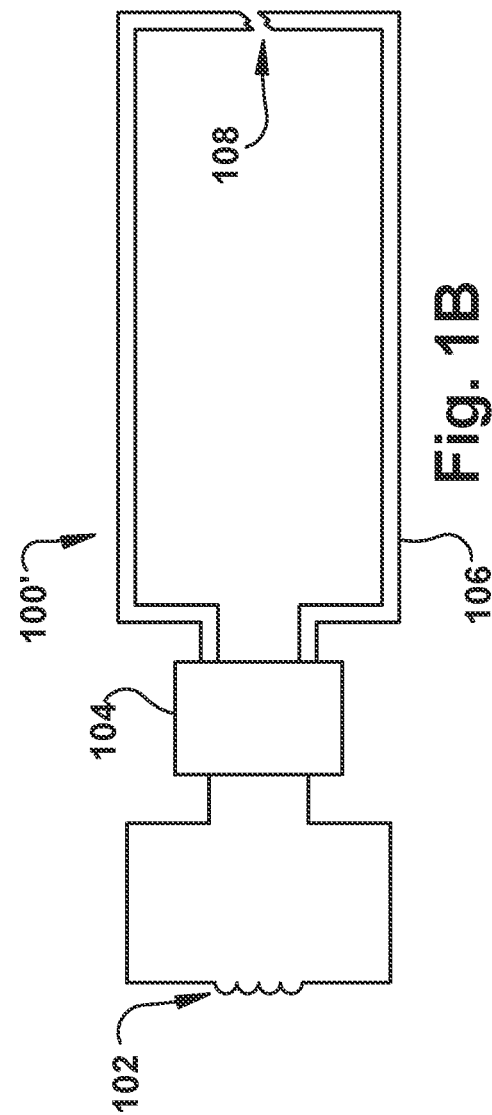
Fig. 1A
Fig. 1B

CONFIGURABLE ANTI-TAMPER SYSTEM AND METHOD

CROSS-REFERENCE TO RELATED APPLICATION

The present application is a 371 of international Application No. PCT/US2020/058886, which was published in English on May 14, 2021, and claims the benefit of U.S. Provisional Patent Application No. 62/930,078 filed Nov. 4, 2019, both of which are incorporated herein by reference in their entireties.

TECHNICAL FIELD

The present disclosure generally relates to Radio Frequency Identification (RFID) devices having configurable anti-tampering structures, and specifically to RFID tags having configurable anti-tamper structures that can be adapted for use in various applications.

BACKGROUND

Radio Frequency Identification ("RFID") devices, such as RFID tags, typically include an antenna that is coupled to an RFID chip. RFID tags typically receive power from nearby radio frequency sources, such as an RFID reader or RFID printer that is transmitting radio frequency energy at the resonant frequency of the RFID tag. When interrogated by an RFID reader, the RFID tag receives power from the RFID reader and transmits a coded return signal. The RFID reader can also program RFID tags in a similar fashion.

Anti-tamper labels and devices allow users to know if an item has been opened, or otherwise tampered with by a third party. For example, shipping containers may be sealed with a tape, or physical device, that provides a visible indication if the shipping container has been opened; bottles, such as pill bottles, may include an anti-tamper label that tears when the bottle is opened; and a door, such as a shipping container door, can indicate that unauthorized service has been performed.

BRIEF DESCRIPTION OF THE DRAWINGS

FIG. 1A is a diagram of an embodiment of an RFID anti-tamper structure with an intact conductive loop.

FIG. 1B is a diagram of an embodiment of an RFID anti-tamper structure of FIG. 1A having a break in the conductive loop.

SUMMARY

Figure 2C:
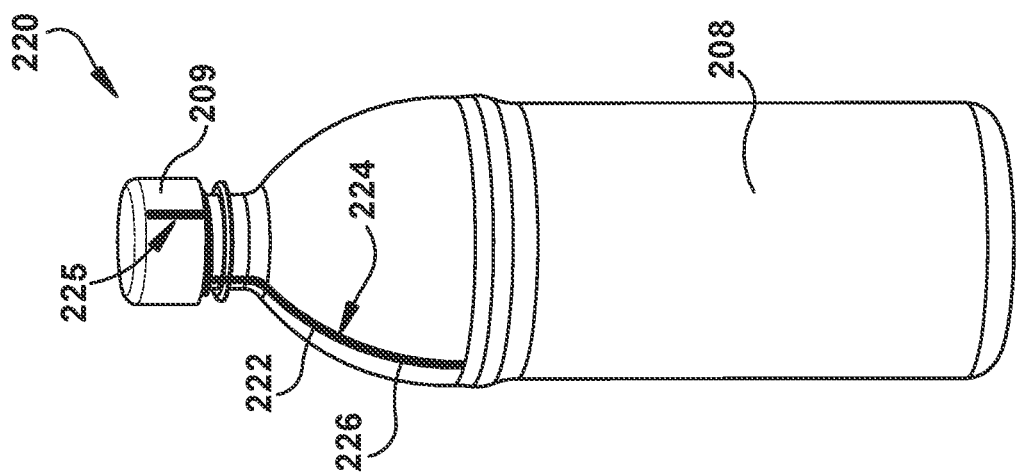
FIG. 2C is a diagram of an embodiment of an RFID anti-tamper structure on an opened bottle.

RFID devices that exhibit anti-tamper monitoring capabilities are described herein. The anti-tamper monitoring functionality can be added to existing RFID tags (e.g., RFID inventory tags) or can be provided in an RFID tag that exclusively offers anti-tamper monitoring.

In some embodiments, the anti-tamper monitoring functionality can be provided by the inclusion of an anti-tampering area to an RFID tag (containing, for example, an RFID chip and antenna structure). In some embodiments, tampering is indicated when the anti-tampering area is damaged or disturbed. In some embodiments, tampering is indicated as above and the damage can temporarily, or permanently, alter the RFID device's response and may be recorded in the memory of the RFID chip. In some embodiments, the anti-tampering area is as described above and can be flexible and, in certain embodiments, can extend in substantially one direction, or in other embodiments, can extend in more than one direction.

In some embodiments, anti-tampering areas can include a substrate and a breakable anti-tamper loop. In some embodiments, the anti-tampering area, including the loop, can be formed using known RFID manufacturing techniques in certain embodiments. In some embodiments, the anti-tamper loop can be formed using similar techniques as those used to form an antenna on a conventional RFID tag. In some embodiments, the anti-tampering area is as described above and the substrate can be identical to, or similar, to known RFID tag substrates such as plastic substrates (e.g., polyethylene terephthalate ("PET"), polyethylene, etc.) or fibrous substrates (e.g., paper or cardboard substrates). In some embodiments, the anti-tampering area can be formed of the same substrate as the remainder of the RFID tag. As can be appreciated however, it can alternatively be advantageous in certain embodiments to make the substrate for the anti-tampering area weaker than the remainder of the RFID tag to ensure that the anti-tampering area indicates tampering without damaging the RFID functionality of the chip and antenna. As can be further appreciated, the strength of the anti-tampering area can be tuned for various applications by modifying the strength of the anti-tampering area substrate. For example, the anti-tampering area can be tuned to be more or less breakable depending upon the use and the expected tampering that might occur.

In some embodiments, the anti-tampering areas may be sized differently depending on the item being monitored. For example, different bottles can have different neck sizes which can require different anti-tampering area sizes.

In some embodiments, the anti-tampering area is supplied in a variety of sizes to avoid the application of poor fitting anti-tamper devices. Traditional manufacturing of anti-tampering devices in customized sizes, however, requires excessive stock, has low production runs, and higher costs. Therefore, in some embodiments, the anti-tamper devices disclosed herein can be easily adaptable to a variety of items (and sizes) through an adaptable anti-tampering area. The anti-tampering area in such embodiments includes breakable segments that can allow the size of the anti-tampering area to be varied.

In some embodiments, the RFID anti-tamper device described herein is configurable such that a single design the can be used in multiple different applications. In some embodiments, the configurable RFID anti-tamper device contains a plurality of breakable segments. In some embodiments, the RFID anti-tamper device contains a plurality of breakable segments configured in a particular configuration. In some embodiments, the particular configuration is a ladder configuration as described in more detail below. In some embodiments, the configurable anti-tamper loop attaches at two points to two pins of the RFID chip. In some embodiments, the RFID antenna is similarly connected to two pins of the RFID chip. In some embodiments, the segments are arranged in series and in parallel such that a series of cuts or breaks can be made to configure the anti-tamper loop for specific applications.

In some embodiments, as described below, the cuts can be made across parallel segments such that current from the RFID chip can flow from one point to another point across a particular segment. In some embodiments, additional cuts can be introduced to isolate the remaining segments. In some embodiments, the remaining structure of the configurable anti-tamper loop can be placed over a seam or break point to detect tampering, which incidental shorting, for example caused by contact with metal, of the segments after a segment is ignored. In some embodiments, certain segments after a particular segment can be trimmed at a cut line, instead of performing the additional cuts as described above. In certain embodiments, perforations in the substrate may be placed near each of the potential seams or break points to allow for the potential rung leftover from a cut to be removed. Removal of the rung can ensure that stray portions of the anti-tamper loop do not cause shorting.

In some embodiments, the configurable anti-tampering area can alternatively extend in more than one direction. In such embodiments, the anti-tampering area can instead contain, include, or is, a plurality of anti-tampering areas extending in orthogonal directions (e.g., to form a cross, or grid), radial directions, etc. In some embodiments, each such anti-tampering area can be a substantially rectangular segment, circular radial segment attached by a ladder structure, or any other arrangement, including any suitable shape or shapes. In some embodiments, a plurality of orthogonal sections can be formed to make a large two dimensional grid. If the anti-tampering area is formed on a flexible substrate, the anti-tampering area can conform to a three dimensional object.

DETAILED DESCRIPTION

As can be appreciated, RFID devices are useful for a variety of applications due to their low cost, small size, and their ability to be remotely powered by an RFID reader or interrogator. For example, RFID devices can be useful for item identification, item tracking, and inventory depending upon the design of the RFID device.

RFID devices can also be used for security. For example, security systems can use RFID devices for access keys, car keys, and inventory tracking. Certain RFID devices have even been made into implantable RFID tags for security purposes. As can be appreciated, when RFID devices include security features, the devices can provide an additional level of security to a location, a product, or even a person. For example, access cards to a secure facility can be made more difficult to duplicate by the use of an RFID device embedded in the card and can provide useful identifying information about a potential admittee to a site, allowing an imposter to be more easily identified. Likewise, an RFID device attached to a product can help ensure that the product is genuine, helping to prevent counterfeiting.

However, RFID devices can present security flaws if they can be altered, exchanged, or removed. An ongoing concern with RFID devices used for security purposes is that they can be cloned, allowing someone to duplicate an RFID tag that has been incorporated into a legitimate access card or an authentic product, which in turn may allow them to make an unauthorized access card or a counterfeit product that still appears to be the real thing. Another concern with RFID devices is that they can be moved or replaced after being applied. For example, a thief may be able to intercept a shipping container marked with an RFID device used to identify the contents in order to remove some of the contents, replacing the RFID device so that it appears to have been improperly prepared.

Although RFID devices can be encrypted to prevent against electronic tampering, RFID devices generally have no ability to store information about its external environment. Additionally, RFID devices are designed to be easily placeable and easily accessible for ease of both placement and reading. As such, typically RFID devices cannot be easily secured by making their locations difficult to access, as this would make them hard to read and harder to place. Likewise, RFID devices often cannot be secured by making them difficult to remove and replace as customers may object to RFID devices being impossible to remove from their products.

The systems and methods disclosed herein are described in detail by way of examples and with reference to FIGS. 1A to 6. It will be appreciated that modifications to disclosed and described examples, arrangements, configurations, components, elements, apparatuses, devices methods, systems, etc. can suitably be made and may be desired for a specific application. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such.

Turning to FIGS. 1A and 1B, an RFID anti-tamper device 100 is presented. The RFID anti-tamper device 100 includes an RFID antenna 102 and RFID chip 104 suitable for the intended operating frequency. For example, the RFID antenna 102 can be a coil if the RFID chip 104 operates in the high frequency range, for example 13.56 Mhz. In another example, the RFID antenna 102 can be a dipole if the RFID chip 104 operates in the ultra-high frequency, for example 860-960 Mhz. Other antenna types and frequency ranges can be used as would be understood in the art. In addition to connections to the RFID antenna 102, the RFID chip 104 includes connections to an anti-tampering area. Specifically, the RFID chip 104 includes a connection to an anti-tamper loop 106 through which a current, i, or a signal passes. An example RFID chip 104 that includes connections for the RFID antenna 102 and connections suitable for connecting to the anti-tamper loop 106 is the UCODE G2iL series transponder from NXP Semiconductors N.V. (Eindhoven, Netherlands).

When the anti-tamper loop 106 is intact, indicating that the anti-tampering area has not been tampered with, the current or signal flows between the pins of the RFID chip 104. Based on the current or signal, the RFID chip 104 sets a parameter in the RFID chip 104 that modifies the response of the RFID chip 104 when interrogated. For example, the RFID chip 104 can set a particular bit, for example a "1" for open and a "0" for conducting, or otherwise map the change in electrical conductivity to a memory location in the RFID chip 104 to modify the response data read by an RFID interrogator. If the anti-tamper loop 106 has a break in it, such as is illustrated in the RFID anti-tamper device 100' of FIG. 1B, then the RFID chip 104 modifies the response to indicate that the RFID anti-tamper device 100' has detected tampering in the anti-tamper area.

In some embodiments, the RFID anti-tamper device 100 can allow a user with an RFID interrogator to determine whether there is evidence of tampering without requiring the user to visually inspect a tamper label for a break, which may not be visible or immediately apparent. Advantageously, the RFID anti-tamper devices 100 can be read by suitable RFID interrogators at any time. For example, RFID anti-tamper devices 100 that are attached to garments or other consumable items can be read continuously or periodically in stores to provide real-time indications of tampering by consumers.

Figure 2B:
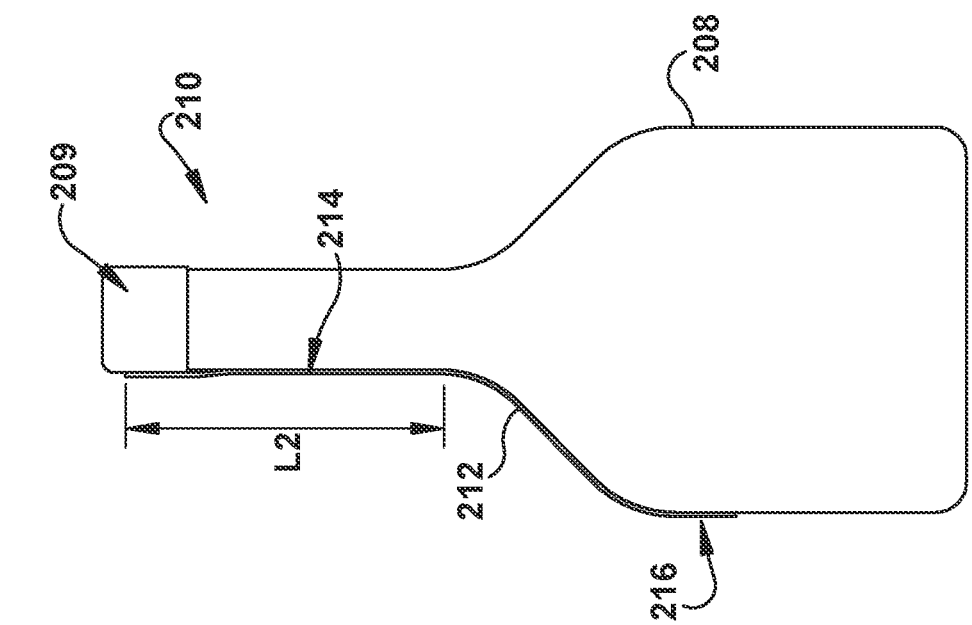
FIG. 2B is a diagram of an embodiment of an RFID anti-tamper structure on a large bottle.
Figure 2A:
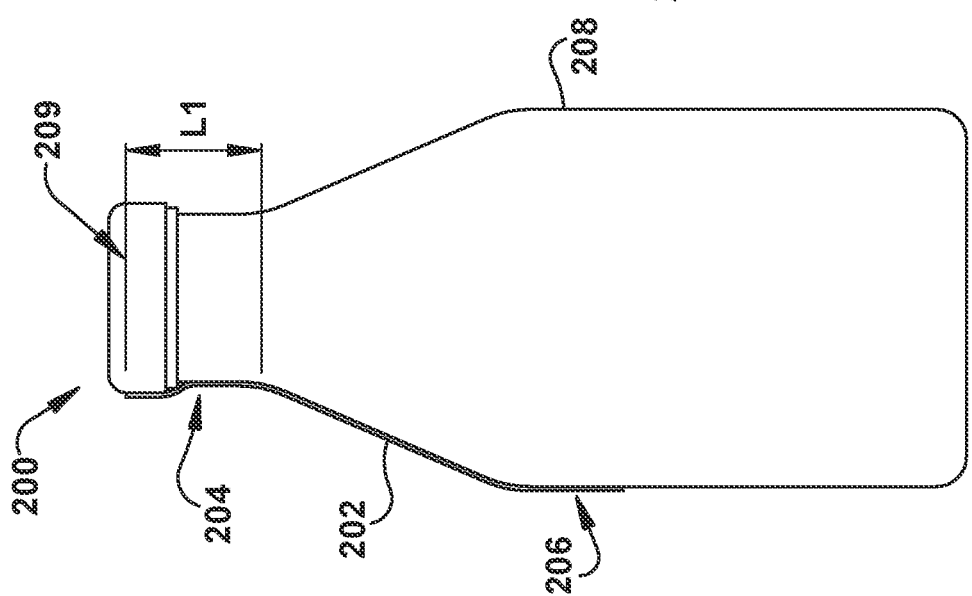
FIG. 2A is a diagram of an embodiment of an RFID anti-tamper structure on a small bottle.

The conductive loop 106 can be of any suitable length, L, depending upon the application. Referring now to FIGS. 2A, 2B, and 2C, embodiments of RFID anti-tamper devices 200, 210, and 220 configured for use on bottles 208 are illustrated. In each, the RFID anti-tamper areas 202, 212, and 222 the antennas 206, 216, 226 are placed on the surface of the bottle 209. The anti-tamper loop 204, 214, 224 is attached across the cap 209 of the bottle 208 such that when the cap 209 is removed, the anti-tamper loop 204, 214, 224 is broken. For example, as illustrated in FIG. 2C, when the cap 209 is unscrewed 228 a portion of the anti-tamper loop 225 remains with the cap 209 and breaks the conductive path in the remaining portion of the anti-tamper look 224.

As can be appreciated, anti-tampering areas may need to be sized differently depending on the item being monitored. For example, different bottles can have different neck sizes which can require different anti-tampering area sizes. In FIGS. 2A and 2B, the neck size is illustrated as $L_1$ and $L_2$ and an anti-tampering area would need to be sized differently depending on the dimensions of $L_1$ and $L_2$ to avoid a poor fit and have reliable detection of tampering.

As can be appreciated, to avoid the application of poor fitting anti-tamper devices, it is necessary to be able to supply the anti-tampering area in a variety of sizes. Traditional manufacturing of anti-tampering devices in customized sizes would require excessive stock, have low production runs, and higher costs. Advantageously, certain anti-tamper devices disclosed herein can be easily adaptable to a variety of items through an adaptable anti-tampering area. The anti-tampering area in such embodiments includes breakable segments that can allow the size of the anti-tampering area to be varied.

Figure 3A:
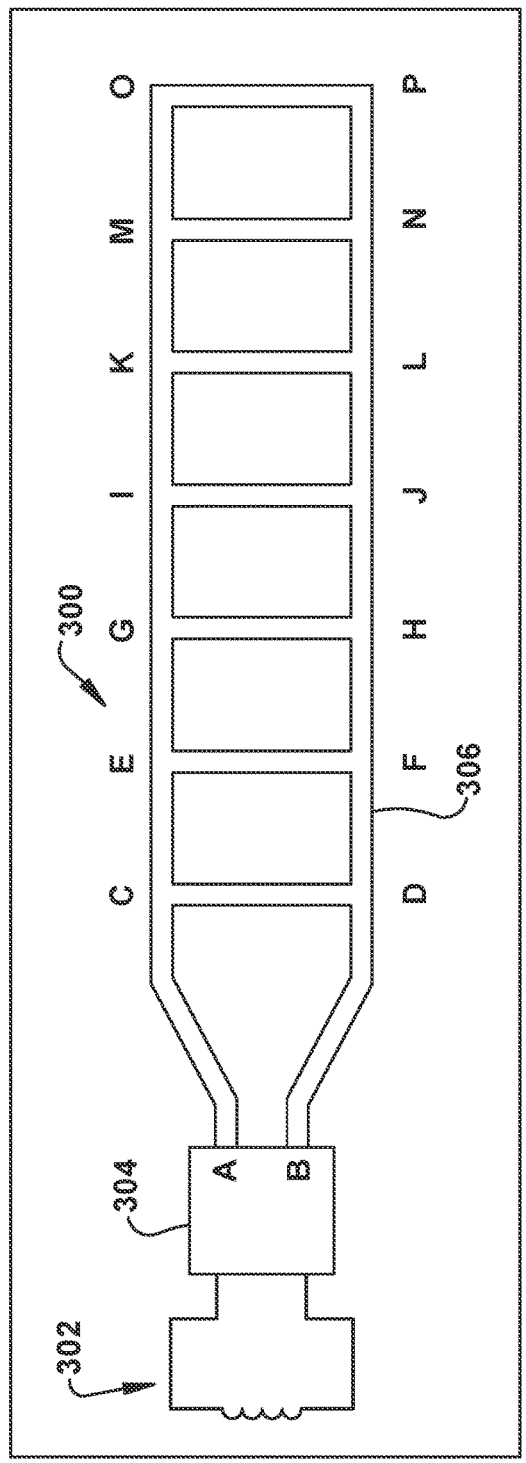
FIG. 3A is a diagram of an embodiment of an RFID anti-tamper device with a configurable anti-tamper structure.
Figure 3B:
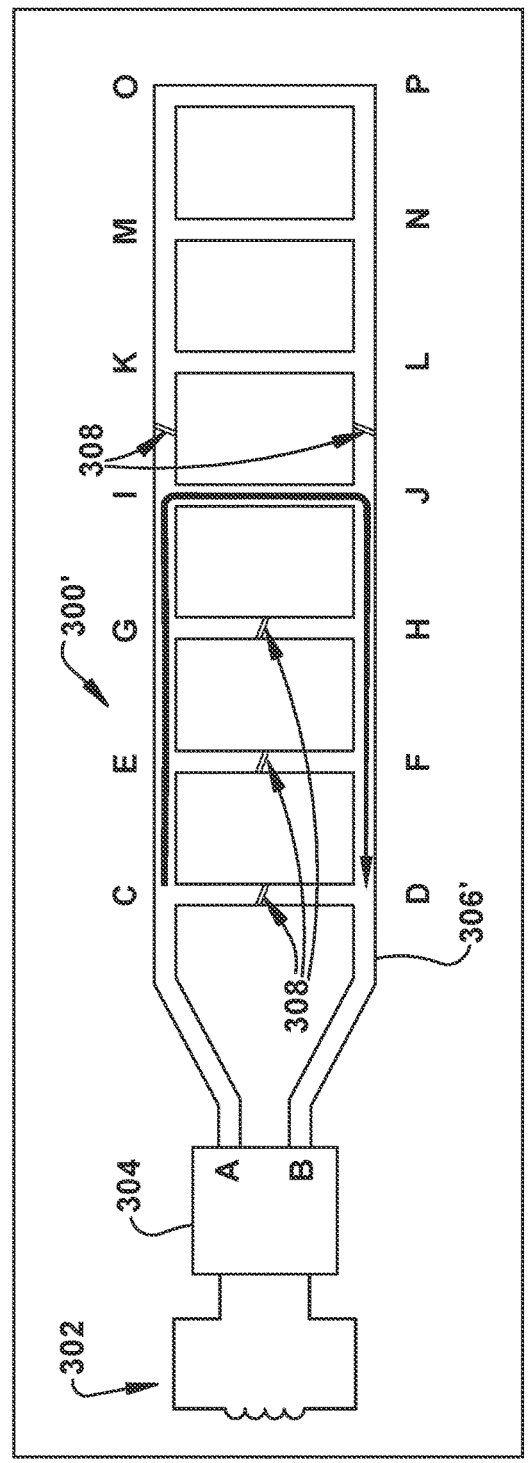
FIG. 3B is a diagram of a first embodiment of the RFID anti-tamper device of FIG. 3A with a configured anti-tamper structure.
Figure 3C:
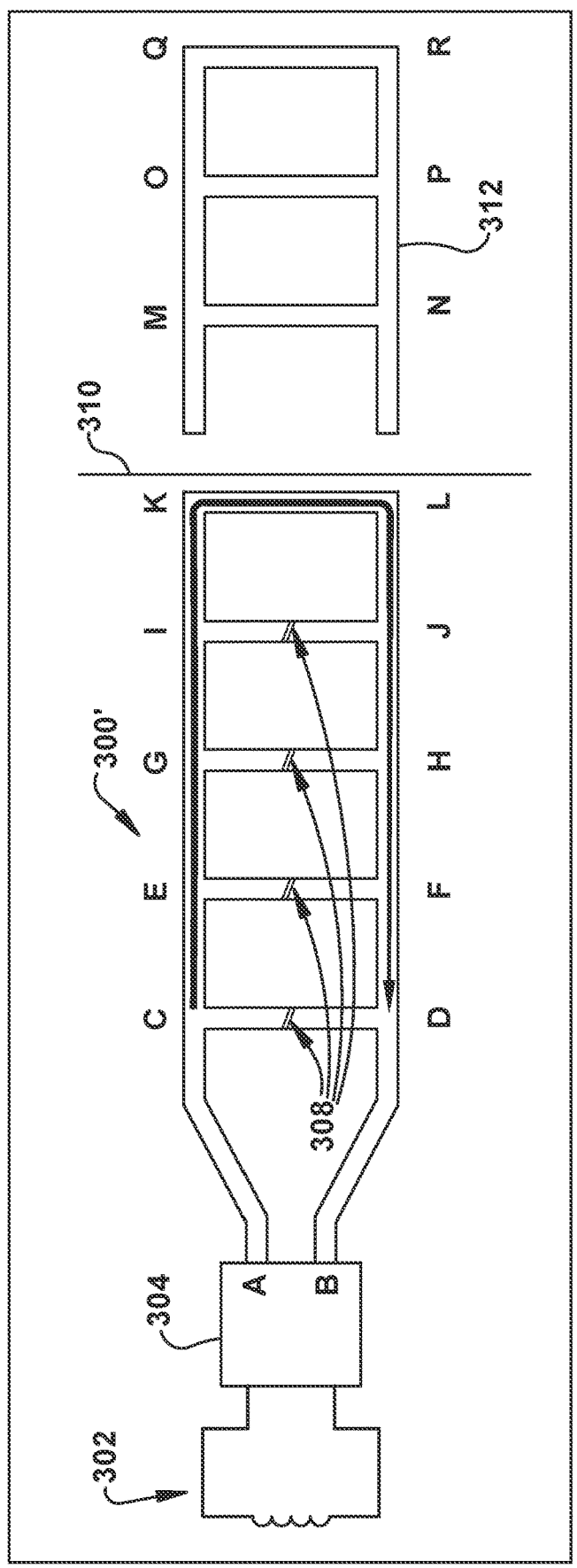
FIG. 3C is a diagram of a second embodiment of the RFID anti-tamper device of FIG. 3A with a configured anti-tamper structure.
Figure 4:
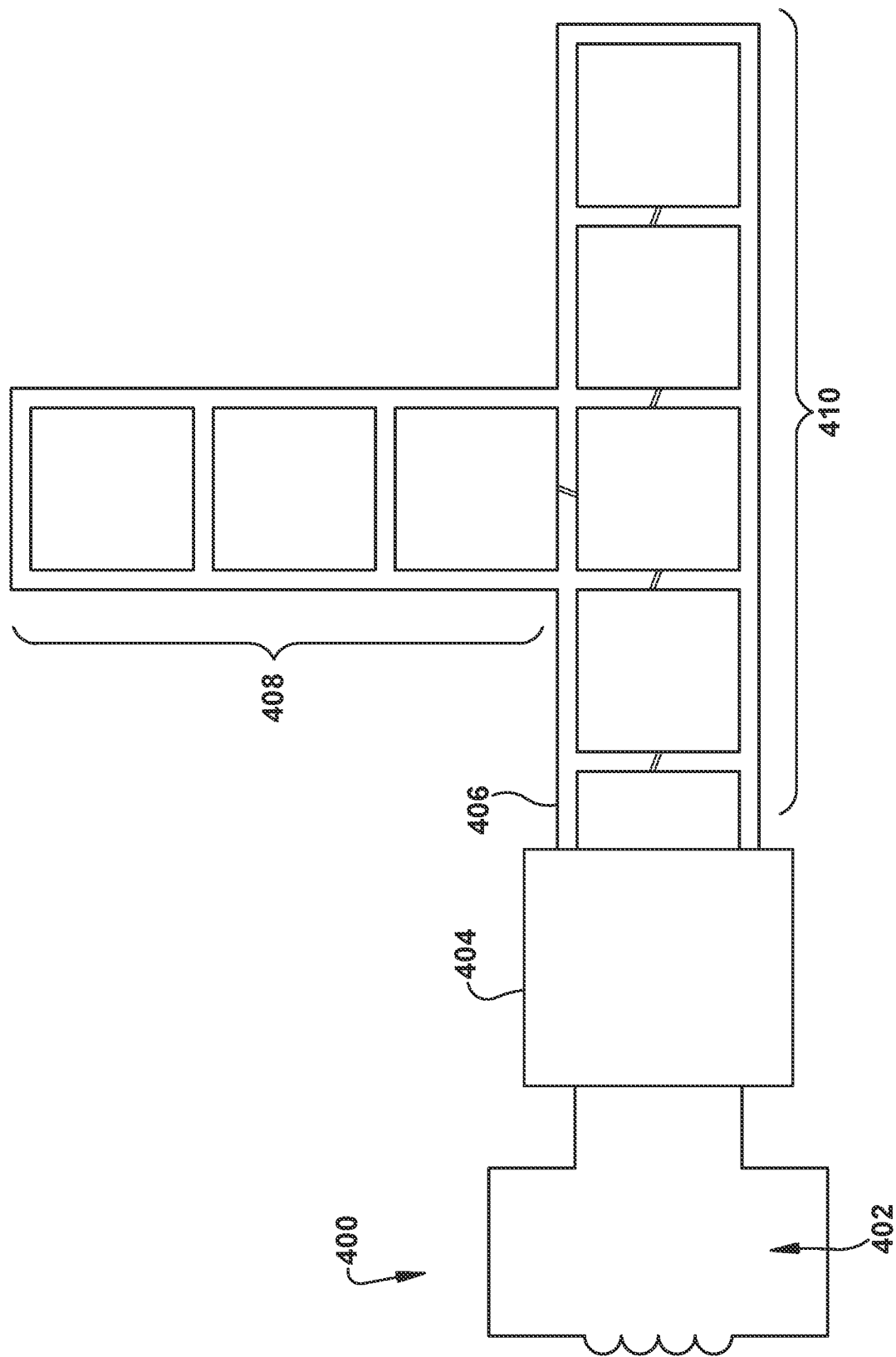
FIG. 4 is a diagram of an embodiment of a RFID device with a configurable two-dimensional anti-tamper structure.

FIGS. 3A, 3B, and 3C illustrate embodiments of a configurable RFID anti-tamper device 300, 300', 300" that permits a single design to be used in multiple different applications. In FIG. 3A, the configurable RFID anti-tamper device 300 illustrates a configurable anti-tamper loop 306 comprised of a plurality of breakable segments configured in a ladder configuration, such as segments C-D, E-F, G-H, I-J, K-L, M-N, and O-P. The configurable anti-tamper loop 306 attaches at point A, B to two pins of the RFID chip 304. The RFID antenna 302 is similarly connected to two pins of the RFID chip 304. As illustrated in the configurable RFID anti-tamper device 300', 300" of FIGS. 3B and 3C, the segments are arranged in series and in parallel such that a series of cuts or breaks can be made to configure the anti-tamper loop 306 for specific applications.

For example, in the configurable RFID anti-tamper device 300' of FIG. 3B cuts 308 can be made across parallel segments C-D, E-F, and G-H such that current from the RFID chip 304 can flow from point A to point B across segment I-J. Additional cuts 308 between I-K and J-L can isolate the remaining segments K-L, M-N, and O-P. The remaining structure of the configurable anti-tamper loop 306 can be placed over a seam or break point to detect tampering, which incidental shorting, for example caused by contact with metal, of the segments after I-J is ignored. In the configurable RFID anti-tamper device 300" of FIG. 3C, the segments after I-J can be trimmed at cut line 310, illustrated as trimmed conductive loop 312, instead of performing the additional cuts 308 between I-K and J-L as described above. In certain embodiments, perforations in the substrate may be placed near each of the potential seams or break points to allow for the potential rung leftover from a cut to be removed. Removal of the rung can ensure that stray portions of the anti-tamper loop 306 do not cause shorting.

In certain embodiments, the configurable anti-tampering area can alternatively extend in more than one direction. In such embodiments, the anti-tampering area can instead comprise a plurality of anti-tampering areas extending in orthogonal directions (e.g., to form a cross, or grid), radial directions, etc. Each such anti-tampering area can be a substantially rectangular segments (as in FIG. 3) circular radial segments attached by a ladder structure, or any other arrangement. In certain embodiments, a plurality of orthogonal sections can be formed to make a large two dimensional grid. If the anti-tampering area is formed on a flexible substrate, the anti-tampering area can conform to a three dimensional object.

Figure 6:
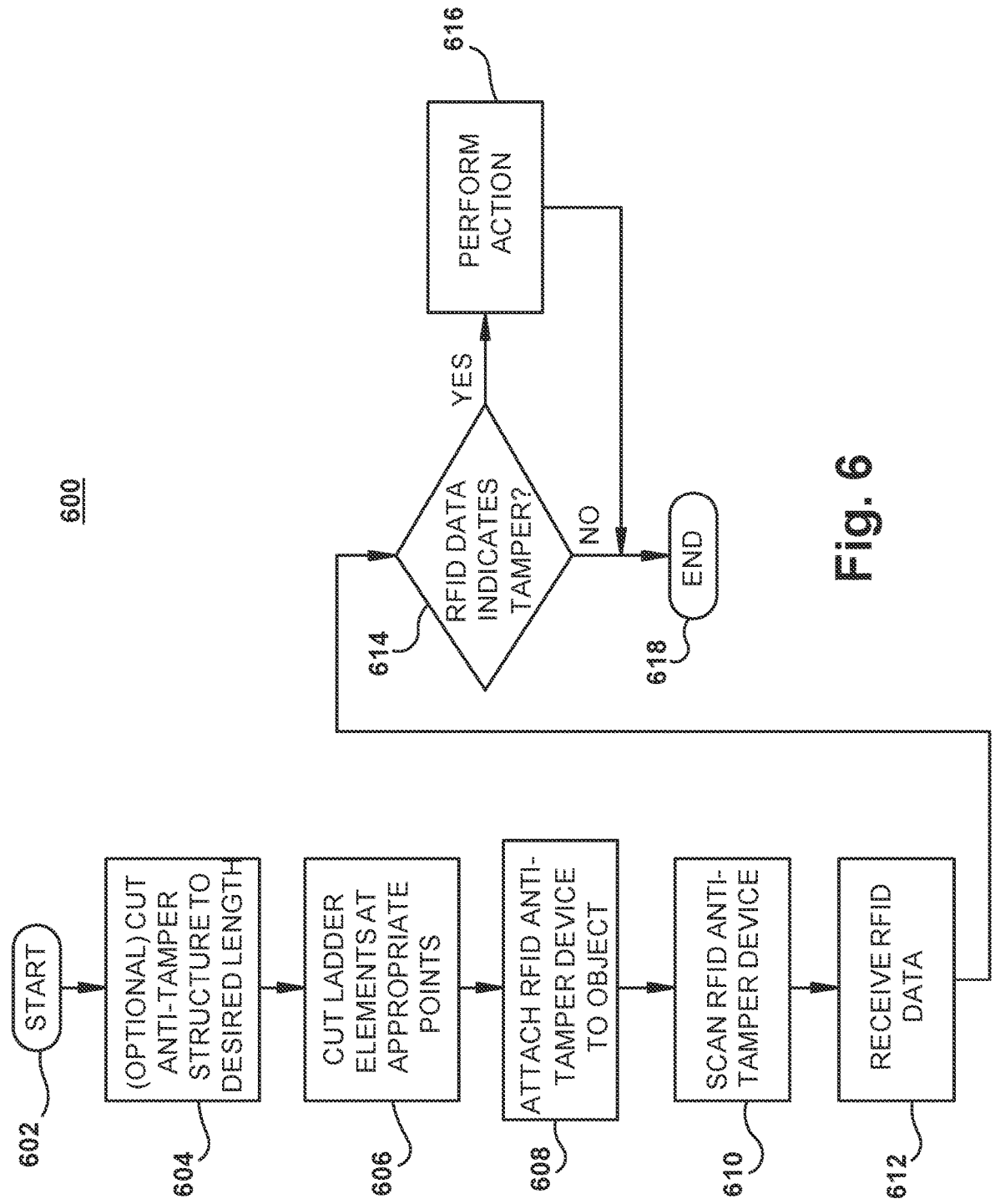
FIG. 6 is a flowchart of example operations for configuring an RFID anti-tamper structure.

FIG. 6 depicts an embodiment of an RFID anti-tamper device 600 having an RFID chip 604, an RFID antenna 602, and a two-dimensional anti-tamper ladder structure 606. The two-dimensional anti-tamper ladder structure 606 can include a first plurality of breakable segments 608 oriented in a first direction and a second plurality of breakable segments 608 oriented in a second direction. The two-dimensional anti-tamper ladder structure 606 advantageously allows the manufacturer to modify a single RFID anti-tamper device 600 so that it can be used in multiple different applications, each having different orientations and positions for the tamper break points. In embodiments, the two-dimensional anti-tamper ladder structure 606 can have any suitable number of segments, shapes, and sizes. For example, the segments can be configured so that the resulting two-dimensional anti-tamper ladder structure 606 includes triangular or curvilinear shapes as would be understood in the art.

Cutting of the ladder segments can be done by any suitable means such as by use of a laser or die. In certain embodiments, the anti-tamper loop 306 can include perforations or other pre-formed scoring that can allow users to more easily modify the cuts in the anti-tamper loop 306. The perforations or scoring can be made with a defined cut/space ratio to help ensure that the cuts 308 do not prematurely or unintentionally break the anti-tamper loop 306.

Figure 5:
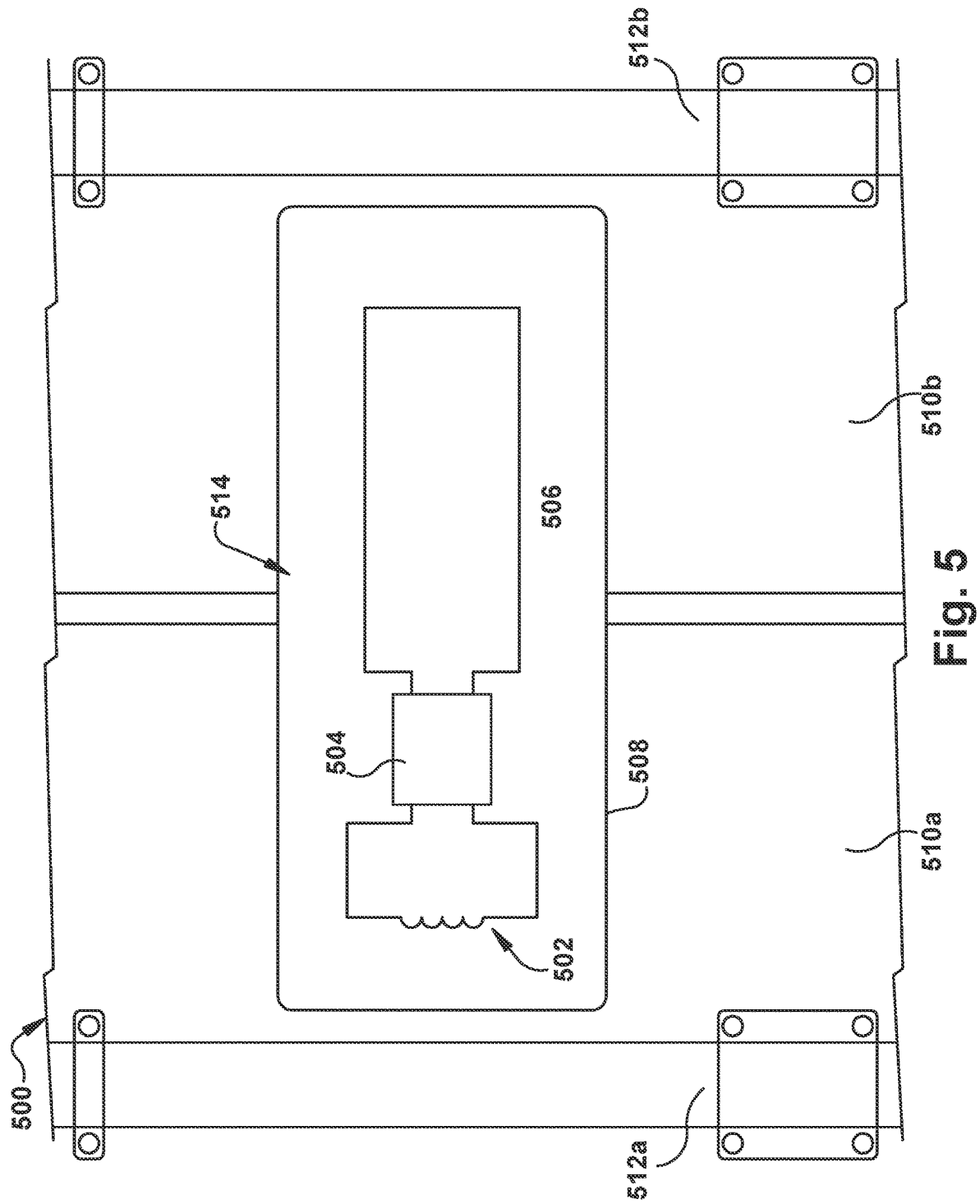
FIG. 5 is a diagram of an embodiment of an RFID anti-tamper structure on a container.

FIG. 5 illustrates a shipping container 500 where an RFID anti-tamper device 508 is positioned on the doors 510a, 510b (collectively doors 510) of the shipping container 500. The doors 510 are rotatably connected to the shipping container by hinges 512a, 512b (collectively hinges 512). When the doors 510 are rotated on the hinges 512 to the open configuration, the widening gap 514 between the doors 510 breaks the anti-tamper loop 506 of the RFID anti-tamper device 508. An RFID reader (not show) can determine if the shipping container 400 has been opened by interrogating the RFID chip 504 of the RFID anti-tamper device 508 through the RFID antenna 502.

In certain embodiments, an RFID anti-tamper device can be reusable. For example, an anti-tampering area used to secure a door (as in FIG. 5) may be reusable in that the anti-tamper loop can reform a conductive path once the door is reclosed. As can be appreciated, such embodiments are more useful when the RFID device receives constant power such as in a continuous monitoring warehouse, truck, etc. In certain such embodiments, the RFID device may also record certain characteristics associated with the opening of the anti-tampering area such as an RFID identity tag of individuals in the area at the time that tampering was detected.

In certain embodiments, an RFID devices described herein can be used with other anti-tampering devices or applications. For example, certain RFID devices can include RFID data recording and monitoring functions, such that the RFID chip of the RFID device can record data based on its position, or records every scan of the RFID chip, or records a specific number of openings and closings of a security seal.

In certain embodiments, an RFID device described herein can include additional security features such as a GPS tracker or an active transponder. Alternatively, or additionally, additional mechanical and chemical anti-tamper structures can also be included. For example, an RFID device with an anti-tampering area can be coupled to an adhesive label or tape that is designed to leave an impression or destroy a printed pattern if the security tape is removed. In certain embodiments, the RFID device can include indicia printed on the adhesive section that becomes activated or visible in response to air exposure to thereby provide visible indications when the RFID device is peeled away. As can be appreciated, other security features can include use of holographic images, thermal ink, UV ink, security substrates and the like as known in the art. Additionally, or alternatively, the mechanical design of the RFID device can be varied. For example, in certain embodiments, the RFID device can include a plastic security strip which is formed of conductive plastic. The anti-tampering area can be formed in the conductive plastic.

Referring now to FIG. 6, a flowchart 600 of example operations for configuring a configurable RFID anti-tamper structure is presented. Operations start at start block 602 and proceed to block 604. At block 604, the anti-tamper conductive loop can optionally be trimmed to a desired length as described above in greater detail. Operations continues to block 606 where segments of the ladder structure of the anti-tamper conductive loop can be cut at appropriate points to generate the desired anti-tamper conductive loop for the application. At block 608, the resulting RFID anti-tamper device can be affixed to the object to be monitored for tampering. At block 610, the RFID anti-tamper device can be interrogated by a suitable RFID interrogator. Depending upon the whether the anti-tamper conductive loop is intact or broker, the RFID chip in the RFID anti-tamper device modifies the data accordingly. At block 612, the RFID interrogator receives the RFID data. At block 614, if the RFID data indicates that the RFID anti-tamper device has been tampered with, then operation continues to block 616, otherwise operations terminate at block 618. At block 616, the RFID interrogator can perform a suitable action, such as presenting a visual or audible indicator that tampering has occurred. Processing then terminates at block 618.

It will be appreciated that the systems and methods describe herein are also suitable for other machines and processes as would be understood in the art. While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the spirit and scope of the inventions.

What is claimed is:

1. A Radio Frequency Identification (RFID) tag, comprising:
   an RFID chip;
   an RFID antenna coupled to the RFID chip; and
   a tamper loop coupled to the RFID chip,
   wherein the tamper loop comprises a plurality of conductive segments, and
   wherein the RFID chip is configured to send first data in response to being interrogated by an RFID reader when the tamper loop is conductive, and second data when the tamper loop has a break and is not conductive,
   wherein the conductive segments are configured in a substantially ladder-like configuration, including a plurality of substantially parallel segments and a plurality of segments positioned substantially in series between the parallel segments.

2. The RFID tag of claim 1, wherein at least a portion of the conductive segments include a perforation for manually breaking the conductive segments.

3. The RFID tag of claim 1, wherein the conductive segments are configured in two substantially ladder-like configuration, that extend generally perpendicularly with respect to one another.

4. A method, comprising:
   attaching an RFID tag including a tamper loop to an object to be monitored for tampering;
   interrogating the RFID tag by an RFID reader;
   receiving first data from the RFID tag when the tamper loop is conductive, and second data when the tamper loop has a break and is not conductive,
   wherein the tamper loop comprises a plurality of conductive segments,
   wherein the conductive segments are configured in a substantially ladder-like configuration, including a plurality of substantially parallel segments and a plurality of segments positioned substantially in series between the parallel segments.

5. The method of claim 4, further comprising:
   breaking at least one conductive segment of the tamper loop prior to attaching the RFID tag to the object to be monitored for tampering,
   wherein the tamper loop remains conductive after cutting the conductive segment.

6. The method of claim 4, wherein breaking the conductive segment is performed by cutting the conductive segment with a die or laser.

7. The method of claim 4, further comprising:
   removing at least one conductive segment from the tamper loop prior to attaching the RFID tag to the object.

8. The method of claim 4, wherein the conductive segments are configured in a substantially ladder-like configuration, including a plurality of parallel segments and a plurality of segments positioned in series between the parallel segments.

9. A method, comprising:
   breaking at least one conductive segment of a tamper loop comprising a plurality of conductive segments, wherein the conductive segments are configured in a substantially ladder-like configuration, having a plurality of parallel segments and a plurality of segments positioned in series between the parallel segments to form a tamper loop having a single conductive path, wherein the tamper loop is coupled to an RFID tag is configured to send first data in response to being interrogated by an RFID reader when the tamper loop is conductive, and second data when the tamper loop has a break and is not conductive.

10. The method of claim 9, further comprising:

attaching the RFID tag including the tamper loop to an object to be monitored for tampering;

interrogating the RFID tag by an RFID reader; and receiving the first data from the RFID tag when the tamper loop is conductive, and the second data when the tamper loop has a break and is not conductive.

11. The method of claim 9, wherein breaking each conductive segment is performed by cutting the conductive segment with a die or laser.

12. The method of claim 9, wherein at least a portion of the conductive segments include a perforation for breaking the conductive segments, and wherein breaking each conductive segment is performed by manually breaking the conductive segment.

* * * * *